June 25, 1963

C. L. FAUST ETAL 3,095,364

MATERIAL REMOVAL

Filed Nov. 27, 1959

Inventors: Charles L. Faust
John A. Gurklis
by Gray, Mase & Dunson Attys.

June 25, 1963   C. L. FAUST ETAL   3,095,364
MATERIAL REMOVAL
Filed Nov. 27, 1959   4 Sheets-Sheet 2

INVENTORS
Charles L. Faust
John A. Gurklis
by Gray, Mase & Dunson, Attys.

INVENTORS
Charles L. Faust
John A. Gurklis

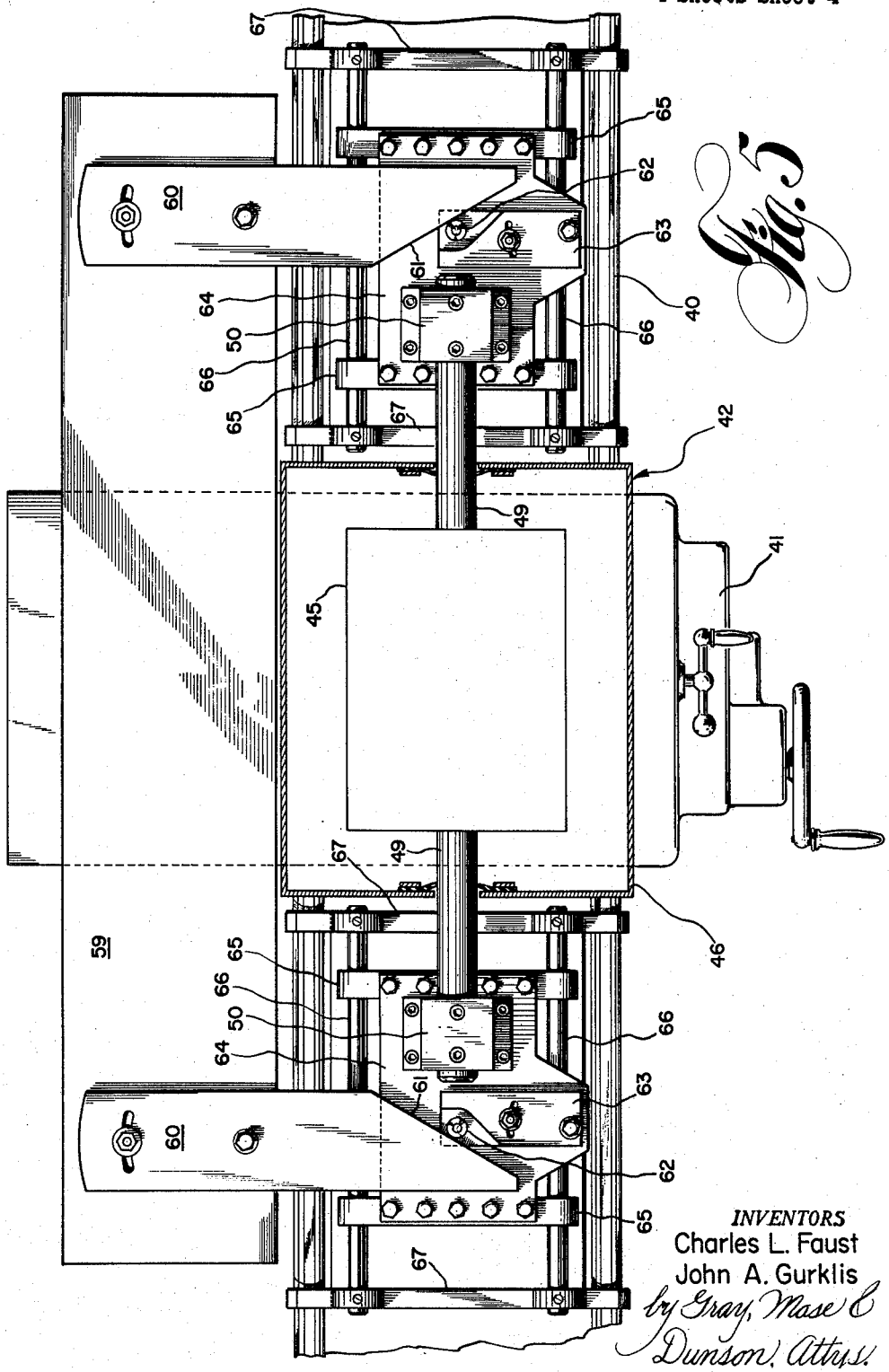

3,095,364
MATERIAL REMOVAL
Charles L. Faust and John A. Gurklis, Columbus, Ohio, assignors, by mesne assignments, to Steel Improvement & Forge Company, Cleveland, Ohio, a corporation of Ohio
Filed Nov. 27, 1959, Ser. No. 855,873
9 Claims. (Cl. 204—143)

The present invention relates to methods and apparatus for electrolytically removing material from an electrically conductive mass to provide a predetermined shape therein.

The invention is particularly advantageous for sinking die cavities, especially irregularly shaped cavities, and for electroshaping objects that may be made to have complex or intricate shapes, by electrochemical methods under novel conditions and control for producing depressions and other desired shapes of predetermined depth and shape in blocks of conductive material, whereby the configurations may be controlled readily and with a high degree of accuracy.

The invention can be employed to shape rough blade forgings into finished blades having close tolerance or into blades requiring much less finish machining or grinding than is necessary in conventional methods. In the discussion of electroshaping herein, the invention is explained in connection with the shaping of turbine blades, although it can be used to shape any object of simple or complex shape.

In the making of dies, the customary method of removing metal chip-by-chip by machining techniques is time-consuming and requires expensive profile-copying machinery and highly skilled craftsmen. Methods that can reduce the time required for making a die, and thereby lower the costs thereof, are needed. This is especially important with the advent of high-temperature alloys for use in missiles, jets, and turbines, because forging of these alloy materials causes much wear and flow of the forming dies. Die life is relatively short, and a method for producing many dies rapidly and economically in replica is greatly needed.

In the making of turbine blades, the customary method of finishing the blade is by the use of expensive machinery or grinding procedures, or both. In addition, considerable hand-blending on the air foil section of the blade with small tools is necessary near the root of the blade.

This operation is time-consuming and requires the services of a skilled craftsman. Methods that can reduce the time required for finishing a blade and thereby lower the costs thereof, are needed. The grinding on the forgings is usually done on very expensive machines employing a grinding belt over a small wheel which traverses the blade being ground by a profiling mechanism, and can only remove very small amounts of metal (e.g., about 0.001 inch per minute). In addition, this belt grinding operation is sometimes very inefficient because at times only part of the belt is doing useful work because of the unevenness or nonuniformity of the rough blade forging. The rates of metal removal with grinding methods are relatively slow, as is indicated above, and this is especially true with the tough new high-temperature alloys being developed for use in missiles, jets, and turbines. These new alloy materials are extremely hard and very difficult to machine.

The practice of this invention permits the use of lower precision forgings for making the blades. This provides savings in the number of heating and hammer operations needed to turn out rough forgings and permits the use of less exact, and therefore less expensive, forming dies. Longer use of existing dies prior to replacing them is made possible by this invention because of its ability to handle less precise forgings.

Electrochemical methods are known for making holes of regular shapes in metals, but even for simple shapes the rates of metal removal are relatively slow. The rates of metal removal are less than 0.005 inch per minute which requires an anodic current density of about 44 amperes per square inch. A more usual rate is of the order of 0.001 inch per minute at proportionately lower current density. Electrochemical methods are also known for removing bulk metal from the body of an object, for producing smooth surfaces, and for removing small amounts of metals for polishing purposes. In these methods the rates of metal removal are relatively slow. A usual maximum rate is of the order of about 0.0003 to 0.001 inch per minute at current densities of about 8 amperes per square inch. Such speeds are impracticably slow for all but the most specialized cases where a material has a hardness and toughness such that conventional machine tool cannot be used. Even when used because of such need, the electrochemical methods of the prior art suffer from lack of precise control over dimensions and shape owing to the well-known fact that electrolytic current distribution does not match the surface contour of electrodes submerged in electrolyte. Current flows in greater concentration from projections, corners, and edges than from recesses and cavities. Therefore, the methods of the prior art have resorted to various auxiliary expedients for redistributing the current, such as: (a) nonconducting materials applied to anode or cathode surfaces or to both, in a selected pattern; (b) interposed nonconducting "dams" to current flow so that a longer path is artificially created, increasing the resistance of current flow from projections, corners, and edges, so as to effect a redistribution of electrolytic current density toward greater uniformity over the surface of the electrodes; (c) auxiliary "robber" anodes to divert some of the current; and (d) bipolar electrodes to increase the relative proportion of current from recessed regions or cavities of the electrode surface of productive interest.

All of these techniques are put to practical use where the workpiece, as cathode for receiving electroplate or an anode for metal removal, can be submerged with the appropriate electrode of opposite polarity in an electrolytic tank. None of the aforementioned techniques, however, nor any others now practiced in the arts of electroplating, electropolishing, electrolytic machining, etc., have been able to produce by electrolysis cavities of substantial depth and irregular wall contour within the dimensional tolerances and reproducibility needed for cavities in dies or molds to be used in the forging, die casing, or plastics molding industries; nor have they been able to produce by electrolysis turbine blades of complex and irregular shape within the dimensional tolerances and reproducibility needed for turbine blade manufacture.

In presently known methods, the usual anode-to-cathode distances are more than ⅛ inch, some being as great as 5 to 15 inches or more. In some special cases of simple forms and inexact contours made by anodic dissolution, a cathode of specified shape may be placed as close as 0.025 inch to the anode workpiece, which is substantially submerged in a relatively large volume of electrolyte. Even such an operation is known to be useful only for removing bulk quantities of metal before further more accurate work is done by conventional metal working machines.

In the electrolytic sinking of a cavity or hole, it is necessary to interrupt the process periodically and to remove coating material from the anode block, to obtain the desired contouring and differences in depths. To remove the protective coating, it is necessary to remove the anode block from the electrolyte bath. Both operations are time-consuming. The periodic interruption of the cavity sinking operation not only is time-consuming and costly, but also tends to build up lines or ridges on the wall of the cavity being sunk, and thereby alters the shape.

None of the practices of the prior electrolytic art are amenable to sinking cavities in metals or to electroshaping turbine blades or other metal objects to achieve accuracies approaching those of conventional machine tools of the chip-by-chip or grinding removal type, even at slow rates of metal removal.

In the present invention, precise control of the disposition of electrolyte in equipment of special design provides cavities of complex wall contour and of differential depths as well as accurate and differential metal removal from blades and other objects of complex contour. Cavities can be electrolytically sunk in electrically conducting materials at penetration rates in excess of 0.005 inch per minute, and air foil sections of turbine blades can be electrolytically shaped with metal removal rates in excess of 0.003 inch per minute on each side simultaneously, but more importantly these products can be made at such rates with dimensional accuracies not heretofore achieved.

This invention provides an improved and more rapid electrochemical method for producing complex die cavities of accurately controlled depth and shape in electrically conductive materials, and for shaping and finishing complex shaped blades and other objects from rough forgings and castings. The method and equipment of this invention are especially useful for electrolytically sinking cavities in electrically conducting materials for use as dies in forging and die casting metals and in molding plastics, and for electrolytically shaping turbine blades or buckets which are used extensively in jet aircraft, missiles, and other engine applications.

Unlike the customary method of chip-by-chip machine or grinding metal removal, the method of this invention is independent of the hardness of the material removed. There is no need for coating or masking the anode, or for the other auxiliary expedients of prior methods, with the well-known attendant disadvantages. There is also no erosion or loss in the cathode tool, which is an important advantage for reproducing successive cavities or other objects accurately, without need for operator judgment as is required in other die-sinking and shaping methods when the tool wears.

It has been discovered as a part of this invention that a small volume of electrolyte moving in a confined space of predetermined three-dimensional contour, at velocities considerably greater than those used in conventional electrolysis, permits electrolytic current distribution of uniformity not obtained heretofore, such that very exact reproduction, as substantially the negative of the shape of a cathode, can be achieved in a mass of electrically conducting material connected as an anode. The resulting cavity or other object requires relatively little, if any, additional work to become a finished item. The electrolytic process provides metal-removal rates in excess of 0.005 inch per minute at voltages less than 15 volts and in some materials even at less than 5 volts.

Thus, the invention utilizes close anode-to-cathode spacing (e.g., 0.002-inch to 0.030-inch gaps), and high velocity directed and controlled electrolyte flow through the small gap between the electrodes, the cathode tool of desired shape and the workpiece as anode, to achieve rapid metal removal and close conformity to the shapes to be provided. The electrolyte is pumped under pressure through a specially designed fixture to provide the high-velocity controlled flow in the gap between the relatively stationary electrodes. The only electrode movement is that associated with advancing the cathode tool, or tools, toward the anode mass at the same rate as electrolytic metal removal takes place. Such movement does not contribute any electrolytic agitation nor influence the electrolyte flow. The electrolyte flow is accomplished by conveying the liquid under pressure to the reaction zone and the means of conveyance are integrally connected with the reaction zone. In other known methods of electrolytic metal removal, the electrolyte is directed by means of a jet or stream toward the object and thus is caused to impinge against the object. This invention differs from such methods in that the entire reaction zone is integrally part of the electrolyte flow system and is under hydraulic pressure (at least about 5 p.s.i. gauge, preferably about 15 to 20 p.s.i. gauge or greater) and not exterior to it as in the prior methods. The known methods would not be adequate for the practice of this invention, for with the directed jet the flow conditions would not provide adequate flow over the reaction zone surfaces.

When a liquid is supplied through an opening under pressure into an empty space, it spreads out with equal flow in all directions if the resistance to flow is equal in all directions within the space. The resistance to flow is inversely proportional to the cross-sectional area and is directly proportional to the length of the path through the empty space. Within a certain range of values of cross-sectional area and path length, a minimum hydraulic pressure can be determined that provides at least a certain desired flow rate in the gap region even in the narrowest gap, sufficient to avoid polarization and thus to assure adequate current.

It is the nature of liquids under pressure to strive to fill all voids equally, and in the present invention sufficient pressure is applied to the electrolyte to keep the gap continuously filled with electrolyte moving at sufficient velocity to avoid any polarization within the gap. After the electrolytic material removal has proceeded for a while, the gap becomes substantially uniform throughout. The directed rapid electrolyte flow permits rapid metal removal by bringing in fresh solution to the active surfaces of the anode mass, and prevents polarization by sweeping away the gases and other electrode products during electrolysis. This permits operation at current densities never before attained in such work, with small gap distances which are conducive to rapid metal removal and good reproduction of the desired shape.

Under the electrolytic conditions of this invention, the electric current flow between the anode mass and the cathode tool begins as soon as any part of the cathode tool reaches the correct distance (or gap) from the anode mass and effective electrolytic current flow is limited to this restricted region. Thus there is no side cutting to disturb the desired contour. As electrolytic dissolution of metal proceeds, more and more area of the cathode tool comes into the correct spacing relationship. The tool is fed at a constant speed equal to the electrolytic dissolution rate, and the contour of the anode mass takes on the contour of the cathode tool without the usual side or undercutting effects that result during electrolysis with shaped electrodes in bulk electrolytic processes. A possible explanation of the superior results obtained is that under the conditions of electrolyte flow with such low applied voltages as less than 15 volts, and for some materials even less than 5 volts, there is virtually no polarization in the surface regions having correct spacing or gap; while in the surface regions at greater spacing, even a few thousandths of an inch greater, polarization and resistance through the electrolyte are enough greater that virtually no current flows in the latter regions.

Electrolytic removal of metal is according to Faraday's law of electrolysis, and metal removal is determined by the number of coulombs of electricity passed. The electrolytic dissolution rate is calculated from Faraday's law, and the feed of the cathode tool is set at this rate, in order to keep up with the dissolution and maintain the gap. If the rate of feed were reduced, the gap and the resistance across it would become greater, and the dissolution rate would decrease. The process would continue in the same manner, but at a slower rate than is obtainable when the gap is maintained within the desired limits, and with more side cutting because of the relatively higher side current. If the cathode were fed at a faster rate than the fastest possible dissolution rate, the gap would gradually become smaller, causing arcs or sparks; and finally the cathode tool would contact the anode mass. In the practice of this invention, arcing and sparking are undesirable, as they would reduce the efficiency of the process and could cause surface damage both to the anode mass and to the cathode tool. Contact of the cathode tool against the anode mass would, of course, virtually stop the electrolytic action and probably would cause damage to the materials and the apparatus.

In the drawings:

FIG. 5 is a top view of the apparatus of FIG. 4; and

Figure 1:
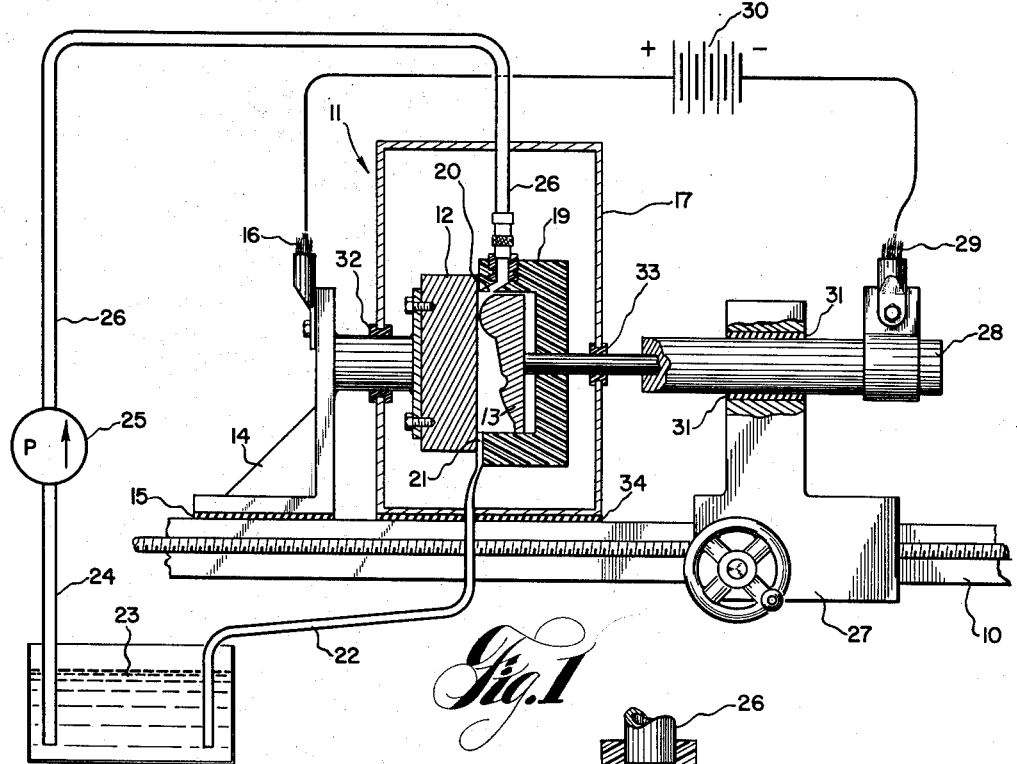
FIG. 1 is an elevational view, partially in section and partially schematic, of die sinking apparatus according to this invention.

In the apparatus of FIG. 1, a lathe bed 10 serves as a basic piece of equipment for an electrochemical die-sinking apparatus 11. Any other suitable machine, such as a vertical drill press, which can provide or be modified to allow for cathode and anode support, controlled cathode and/or anode advance, electrolyte flow system and shield, current carrying, etc., can be utilized. The apparatus 11 provides a die cavity in the anode block 12 through the controlled advance of the cathode tool 13 which has a shape substantially the same as the cavity shape to be produced in the anode block 12.

Figure 2:
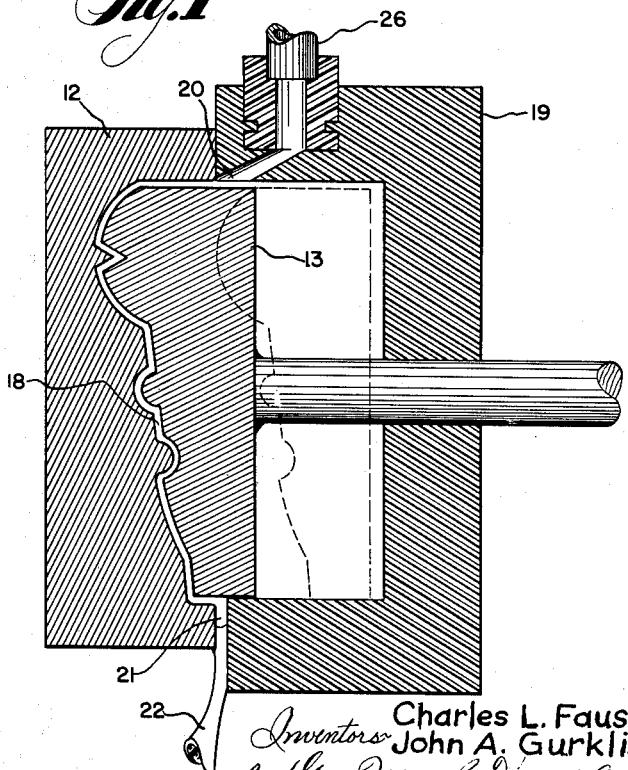
FIG. 2 is an enlarged sectional elevation of part of the apparatus of FIG. 1 after the apparatus has been in operation for some time.

A typical die-sinking operation is carried out as follows: The anode block 12, which is to receive the electroformed cavity, is attached to the anode support 14, which is electrically insulated from the lathe by insulation 15, and to which a connection from the anode bus bar 16 is made. The anode block 12 is positioned inside a spray box or splash hood 17. The contour and shape of the cathode tool 13 correspond substantially to the shape and contour of the desired cavity. FIG. 2 shows the electrolyte flow zone 18 between the cathode tool 13 and the anode die block 12.

Where the cathode tool is the exact negative of the desired cavity, the dimensions of the resulting cavity may vary as much as a few mils from the desired dimensions, because of the differences in current density where the surface has different shapes. In the present invention, the close spacing and high velocity of electrolyte flow through the gap minimize the differences in current density, but slight differences do exist. For maximum accuracy, the shape of the cathode tool should deviate very slightly from the exact negative of the desired cavity, in such manner as to compensate for the slight variations in current density over the various portions of the surface. A tool having such a shape may be said to correspond "electrolytically" to the shape of the desired cavity. One simple way to make a tool that corresponds electrolytically to the desired shape is to start with a cavity or a pattern of the cavity provided with a conductive surface of the exact shape desired and connect it as the cathode to shape the tool, connected as the anode, using the method and apparatus of the present invention. Since the current distribution is the same in each case, the resulting tool when connected as the cathode according to the present invention can produce cavities identical to the cavity from which the tool itself was shaped electrolytically.

A clear, transparent, plastic guide box 19 is attached to the anode block 12. The guide box 19 has an inlet 20, through which electrolyte enters the space between the die block 12 and the tool 13, and an outlet 21, through which the electrolyte flows from the flow zone 18 and out of the assembly 12, 13, 19. Tubing 22 conveys the electrolyte to a reservoir 23 from which tubing 24, a pump 25, and tubing 26, supply the electrolyte under pressure to the inlet 20. The inlet 20 and the outlet 21 may be slotted, round, or any other convenient shape.

The lathe threading mechanism, acting through suitable conventional reduction gearing and the lathe carriage 27, advances the cathode tool 13 so as to maintain the desired spacing between the die block 12 and the tool 13. The cathode tool holder 28 receives current from the cathode bus bar 29 which is connected to the negative terminal of a direct voltage source 30, the positive terminal of which is connected to the anode bus bar 16. The tool holder 28 is insulated by insulation 31 from the lathe carriage 27. The spray box 17 may be made of insulating material or may be provided with insulation at 32 and 33 to insulate it from the die block 12 and the tool 13 and with insulation 34 to insulate it from the lathe bed 10.

The desired rate of cathode tool advance is provided by utilizing the carriage advance setting that matches the electrolytic metal dissolution rate.

An example of the practice of this invention providing good reproduction to close tolerances of repeated die-sinking operations is the following, in which a complex-shaped die cavity with depths ranging from 0.05 to 0.50 inch was sunk:

| | |
|---|---|
| Initial gap distance | 10–15 mils. |
| Electrolyte circulation | 5.3 gal./min. |
| Electrolyte velocity through gap | 114 ft./sec. (6,820 ft./min.). |
| Electrolyte composition | 54 g./l. $H_2SO_4$, 10 g./l. NaCl. |
| pH range | 0.0 to 1.0. |
| Temp. range | 80°–125° F. |
| Voltage | 4.5–3.6 volts. |
| Current | From 60 amps at start to 530 amps. at end. |
| Average current density | 75 amp./sq. in. at end of run. |
| Rate of advance | 16.3 mils/min. (rates as high as 25–30 mils/min. have been utilized for other die shapes). |
| Reproducibility | Agreement within 1–3 mils for depths ranging from 0.05 to 0.5 inch for five cavities produced under closely identical conditions. |

Table I and II, below, list data for successive cavities sunk in steel die blocks with an electrolytic cathode tool 13 having a shape approximately as shown in the drawings. The excellent reproducibility is evident from the data. The cavities were sunk in 25 minutes whereas conventional sinking using a suitable commercially available machine would require about 4 hours of machine time.

TABLE I

*Comparison of Die-Cavity Depth Measurements for Five Duplicate Runs for Checking Reproducibility of Die-Sinking Procedures* [a]

| Distance Along Cavity [b] or Designated Point [b] | Depth Measurements, inch | | | | |
|---|---|---|---|---|---|
| | Run M | Run N | Run O | Run P | Run Q |
| 0.5 inch (deepest point of cavity) | 0.498 | 0.498 | 0.499 | 0.498 | 0.498 |
| 1.5 inches | 0.186 | 0.184 | 0.186 | 0.184 | 0.184 |
| 2.5 inches | 0.187 | 0.185 | 0.186 | 0.186 | 0.186 |
| Point C (minimum depth on convex-shaped rise of cavity) | 0.059 | 0.055 | 0.058 | 0.057 | 0.056 |
| Point A (peak of cone-shaped knob in cavity) | 0.356 | 0.356 | 0.356 | 0.357 | 0.358 |
| Point B (deepest point in screw-head shaped depression in cavity) | 0.388 | 0.388 | 0.387 | 0.388 | 0.387 |

Figure 3:
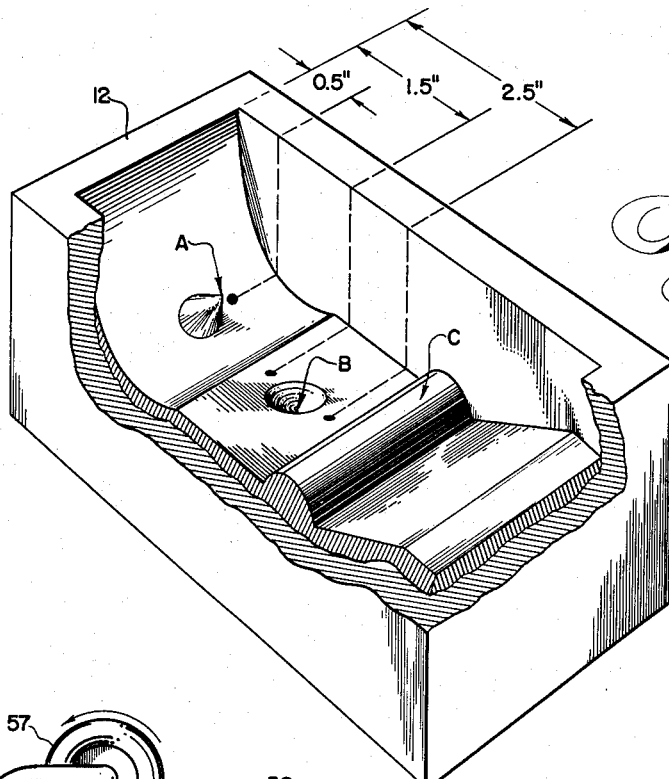
FIG. 3 is a perspective view, partially cut away, of the anode block in FIGS. 1 and 2 after the apparatus has provided a die cavity therein.

[a] All the runs were carried out under the following operating conditions: die-sinking rate—16.3 mil/min.; gap at start of run—12 mils; depth cathode tool advanced—484 mils; electrolyte composition—55 g./l. $H_2SO_4$, 10 g./l. NaCl, 10 g./l. citric acid; pH range—0.0–0.2, periodic additions of $H_2SO_4$ were made to the electrolyte to maintain the pH in this range during the run; temperature range—82–122° F.; voltage range—4.5–3.6 volts; current range—60–530 amperes; electrolyte flow rate at end of runs—19.4 l./min.
[b] See Fig. 3.

TABLE II

*Comparison of Die-Cavity Width Measurements for Five Duplicate Runs for Checking Reproducibility of Die-Sinking Procedures* [a]

| Distance Along Cavity Length, inches | Width Measurements, inches | | | | |
|---|---|---|---|---|---|
| | Run M | Run N | Run O | Run P | Run Q |
| 0.0 | 1.10 | 1.10 | 1.11 | 1.11 | 1.11 |
| 0.2 | 1.22 | 1.22 | 1.23 | 1.23 | 1.23 |
| 0.5 | 1.25 | 1.25 | 1.26 | 1.25 | 1.26 |
| 1.0 | 1.15 | 1.15 | 1.16 | 1.15 | 1.15 |
| 1.5 | 1.15 | 1.15 | 1.16 | 1.15 | 1.15 |
| 2.0 | 1.15 | 1.14 | 1.15 | 1.15 | 1.15 |
| 2.5 | 1.15 | 1.14 | 1.15 | 1.15 | 1.15 |
| 3.0 | 1.14 | 1.14 | 1.14 | 1.14 | 1.15 |
| 3.4 | 1.08 | 1.08 | 1.08 | 1.08 | 1.08 |
| 3.8 | 1.14 | 1.13 | 1.14 | 1.14 | 1.14 |
| 4.0 | 1.12 | 1.12 | 1.12 | 1.12 | 1.13 |
| 4.5 | 1.07 | 1.07 | 1.07 | 1.08 | 1.08 |
| 5.0 | 1.02 | 1.03 | 1.03 | 1.02 | 1.02 |

[a] For a detailed description of die-sinking operating variables for the runs, see Table I, footnote [a].

Good reproduction was also obtained for sinking turbine blade die cavities of complex shape. Cavities were sunk for both the top and bottom forging dies. The cavity dimensions for one of the blades were as follows: length—4.0 inches; width—varying from 1.0 to 2.0 inches; depth—varying from 0.080 to 0.615 inch. For another blade the die cavity dimensions were: length—5.10 inches; width—2.00 inches; depth—varying from 0.085 to 0.705 inch respectively.

Figure 6:
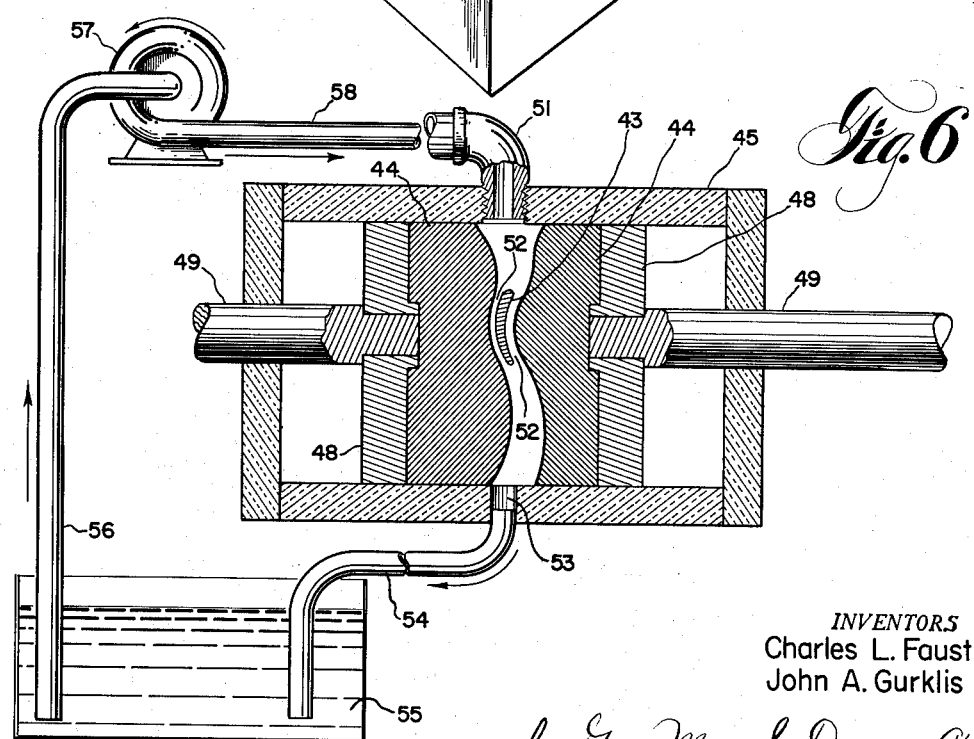
FIG. 6 is an enlarged sectional elevation of part of the apparatus of FIGS. 4 and 5 after the apparatus has been in operation for some time.
Figure 4:
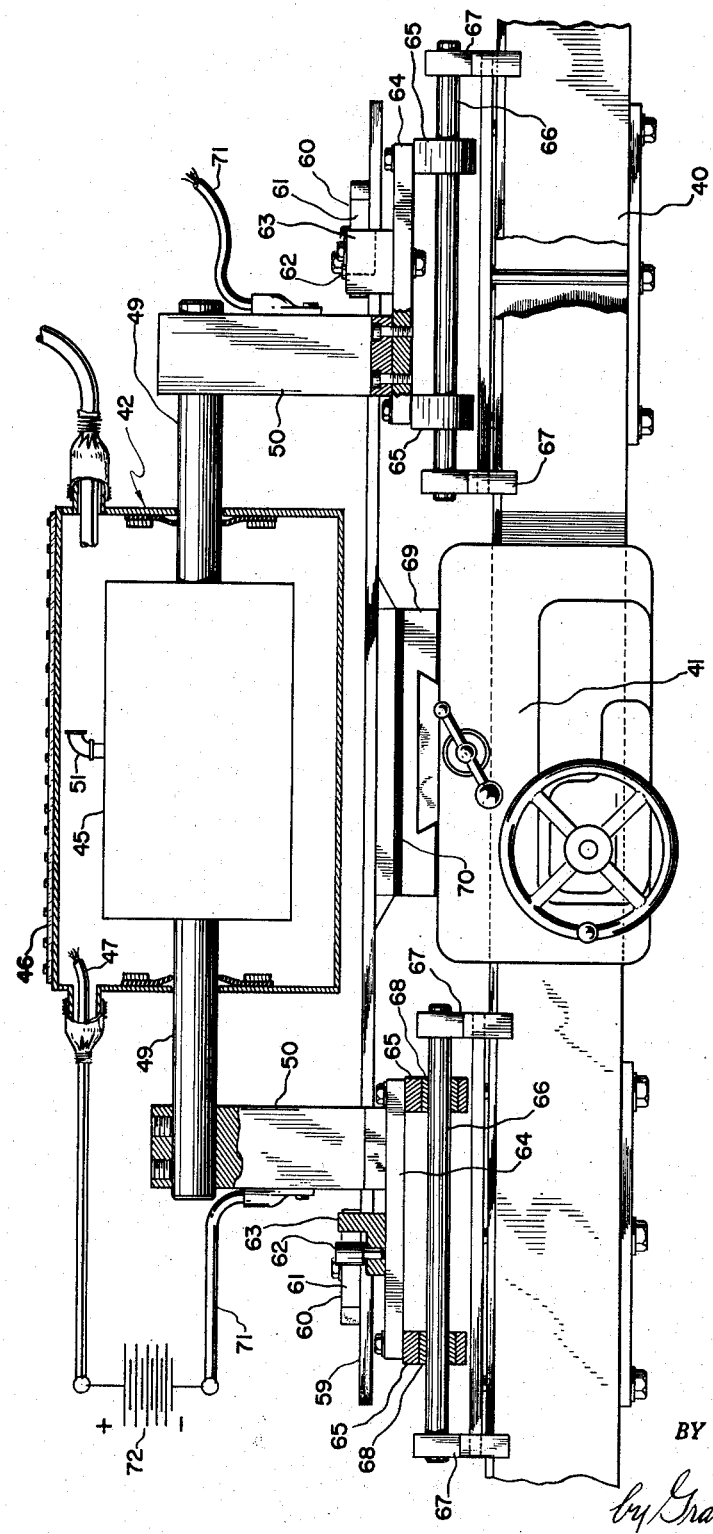
FIG. 4 is an elevational view, partially in section and partially schematic, of electroshaping apparatus according to this invention.

In the apparatus of FIGS. 4–6, lathe bed 40 and cross-feed mechanism 41 serve as a basic piece of equipment for an electrochemical blade shaping apparatus 42. Any other suitable machine that can provide or be modified to allow for cathode and anode support, controlled cathode advance, electrolyte flow system and shield, current carrying, etc., can be utilized. The apparatus 42 provides for electroshaping of the blade 43 through the controlled advance of the cathode tool 44, which have shapes that are substantially the same as the shapes to be produced on the respective sides of the anode blade 43.

A typical electroshaping operation is carried out as follows: The anode blade 43 is rigidly mounted in a holder (not visible in the drawings), which provides for inserting and properly aligning the blade 43 in the guide box fixture 45, which is accurately positioned inside of the electrolyte shield box 46. The anode lead connection 47 is made to a projection (not shown) extending from the root section of the blade 43. The cathode tools 44 are attached to cathode backing plates 48 which are in turn attached to the cathode shanks 49 which are mounted in the cathode mounting blocks 50. The contour and shape of the cathode tools 44 correspond substantially to the shape and contour desired for the respective sides of the blade 43. The cathode tools 44 and backing plates 48 are carefully positioned inside the clear, transparent, plastic guide box 45. The guide box 45 has an inlet 51, through which the electrolyte enters the spaces or gaps 52 between the blade 43 and the cathode tools 44; and an outlet 53 through which the electrolyte flows from the flow zone gaps 52 and out of the guide box 45. Tubing 54 conveys the electrolyte to a reservoir 55, from which tubing 56, a pump 57, and tubing 58, supply the electrolyte under pressure to the inlet 51.

The cross feed mechanism 41, receiving its drive from the lathe threading mechanism and suitable conventional reduction gearing, supplies the drive for advancing the cathode tools 44 toward the blade 43. The cross-feed drive mechanism 41, acting through the cross-feed drive plates 59 to which the cathode advance plates 60 are attached, provides for horizontal motion of the cathode tools 44 through the horizontal component of the angular faces 61 on the cathode advance plates 60. The angular cathode advance plates 60 exert pressure on the cam followers 62, which are fastened to adjustable cam-follower blades 63. These in turn are attached to the cathode carriage bases 64 to which the cathode mounting blocks 50 are attached. The cathode carriage bases 64 are attached to the cathode carriage bearing blocks 65 which can slide on the guide bars 66 held by the cathode carriage guide bar blocks 67. Insulation of the cathode assemblies from the lathe is provided by molybdenum-impregnated nylon sleeve bushings 68, which are pressed into the carriage bearing blades 65. The cross-feed drive plate 59 is insulated from the lathe cross slide 69 by a sheet of mica or other suitable nonconducting material 70. The cathode mounting blocks 50 receive current from the cathode bus bars 71, which are connected to the negative terminal of a direct voltage source 72, the positive terminal of which is connected to the anode bus bar 47.

The desired rate of cathode tool advance is provided by utilizing the cross feed drive setting that matches the electrolytic metal dissolution rate on the blade.

An example of the practice of this invention providing good reproduction to close tolerances of repeated blade electroshaping operations is the following, in which the air foil section of a complex-shaped turbine blade of S816 alloy (nominal composition in weight percents: 44 $C_o$, 20 Ni, 20 Cr, 4 W, 4 Mo, 4 Cb, 0.4 C, balance Fe) was electroshaped.

| | |
|---|---|
| Initial gap distance | 5–10 mils. |
| Electrolyte circulation | 8.0 gal./min. |
| Pressure | 15 to 20 p.s.i. gauge. |
| Electrolyte velocity through gap (based on end conditions and assumed average gap distance at end of 5 mil) | 4800 ft./min. or 80 ft./sec. |
| Electrolyte composition | 45 g./l. $H_2SO_4$, 10 g./l. NaCl, balance water. |
| pH range | 0.3–0.4. |
| Temp. range | 80–90° F. |
| Current | From 160 amps. at start to 180 amps. at end. |
| Volts range | 4.1–3.6. |
| Average current density (area=8.6 sq. in.; current 180 amps) | 21 amperes/sq. in. |
| Rate of advance | 5.2 mils/min. |

Most of the current goes to those areas where the gap distance is smallest, about 0.002 to 0.03 inch, preferably about 0.005 to 0.02 inch. Metal is removed more rapidly at such areas of the anode mass and the gap distance increases. Then the bulk of the current shifts to areas where the gap distance is smaller. In this way, with gap distance playing a very important part under controlled voltage conditions, good contouring results over the entire surface.

With the tool and guide designs and operating conditions as disclosed herein, an essentially self-adjusting process results to closely reproduce the contour desired.

The electrolyte for the metal-removal operation is very important for operating at close anode-to-cathode relationship, especially at the relatively high current densities at times exceeding 50 amperes per square inch. In some electrolytes, material may precipitate on the cathode. This cathodic product build-up is undesirable as it can result in altering the cathode tool shape, or can also cause shorting out between the anode mass and the cathode if the product build-up becomes large enough. Shorting out usually results in damage to both the cathode tool and the anode mass, and should be avoided.

It has been determined that optimum results are obtained with an electrolyte comprising essentially about 5 to 65 grams per liter of sulfuric acid and about 2 to 15 grams per liter of sodium chloride. The temperature of the electrolyte preferably is maintained at about 75 to 125° F.

Most of the metals in die steels are above hydrogen in the normal electromotive series, and electrodeposition of them from acid electrolytes depends on having a relatively high hydrogen overvoltage. When metal deposition is unwanted, it is desirable to lower the hydrogen overvoltage as much as possible so that hydrogen discharge is favored over metal deposition. It is preferred to use special electrolyte compositions or addition agents to electrolytes, such as small amounts of platinum, iridium, chromium, and vanadium, to reduce hydrogen overvoltage, which either prevent cathodic deposition or produce easily dislodged or filterable precipitates or deposits. Such acids as oxalic and citric acids can be added to the electrolyte to increase the solubility of any metal oxides that may be formed. Regularly replacing the electrolyte keeps a troublesome cathode deposit from building up in the electrolyte.

The ideal electrolyte is one that contains enough hydrogen ion to keep acidic the thin layer of electrolyte referred to as the anode film so that it is not neutralized by dissolved metal which would precipitate as a basic salt on the surface of the anode mass where the precipitate would act as a stop-off to disturb and distort the contour shape. The volume of electroyte in the electrolysis zone is so small for the high rate of anodic dissolution, even at the exceptionally high flow rates, that were the acidity not above the minimum, the electrolysis zone would become neutralized and choked with precipitates of metal dissolved from the anode mass. Furthermore, maintenance of acidity above a minimum value is required so that the conductivity remains good at all times for dissolution at minimum voltage and maintenance of maximum diesinking rate. The pH should be less than about 6. The preferred range of acidity is from aobut 0.1 to 2 normal. In such an electrolyte, the applied voltage across the gap is thus at the minimum for dissolution at the desired gap size, but is not large enough to cause current to flow between the cathode electrode tool and the surface of the anode mass where the distance exceeds the intended operating gap width.

To summarize, the present invention includes a method and apparatus for electrolytically removing material from an electrically conductive mass to provide a predetermined shape therein, comprising means for, and the steps of: connecting the mass to the positive side of a direct current supply; connecting to the negative side of the direct current supply at least one electrically conductive tool, each having in at least a portion thereof substantially the shape to be provided in at least a portion of the mass; placing each tool in close proximity to the mass and maintaining a gap of about 0.002 to 0.03, preferably 0.005 to 0.02, inch between the closest portions of each tool and the mass; supplying an electrically conductive electrolyte, preferably under a pressure of at least about 5 p.s.i. gauge, throughout each gap between the closest portions and flowing the electrolyte through each gap at a speed relative to the adjacent surfaces of each tool and the mass of about 20 to 250, preferably 25 to 135, feet per second; and maintaining a voltage of about 2 to 15, preferably 2.5 to 9, volts between each tool and the mass, to provide a current density of at least about 5, preferably 50 to 200, amperes per square inch through the electrolyte in each gap between the closest portions of each tool and the mass. Relative to the mass, each tool preferably is moved toward the mass along a straight line at a predetermined rate substantially equal to the rate at which material is removed from the mass adjacent to each gap. Either the tool or the mass, or both, may be moved relative to the surrounding apparatus to provide the proper relative movement to advance the tool toward the mass.

While other electrolytes may be used that permit anodic dissolution at reasonable rates without polarization at the voltage used, that do not electrodeposit material on the cathode tool, and that meet the other requirements discussed above, the electrolyte preferably should comprise essentially sulfuric acid and sodium chloride. The acidity of the electrolyte should be maintained at a pH less than about 6, preferably at about 0.1 to 2 normal. The temperature of the electrolyte should be maintained at about 75 to 125° F. A preferred electrolyte is an aqueous electrolyte for electrolytically removing material from an electrically conductive mass comprising essentially about 5 to 65 grams per liter of sulfuric acid and about 2 to 15 grams per liter of sodium chloride. It is desirable to include also a minor amount of at least one material selected from the group consisting of platinum, iridium, chromium, and vanadium.

While the forms of the invention herein disclosed constitute preferred embodiments, it is not intended herein to describe all of the possible equivalent forms or ramifications of the invention. It will be understood that the words used are words of description rather than of limitation, and that various changes may be made without departing from the spirit or scope of the invention.

What is claimed is:

1. Apparatus for electrolytically removing material from an electrically conductive mass to provide the mass with a surface having a predetermined three dimensional contour and shape, comprising in combination: an electrically conductive tool, said tool having an imperforate working face portion having substantially the contour, shape and area of the surface with which the mass is to be provided; positive drive means for advancing said tool relative to said mass and for maintaining a gap of about 0.002 to 0.03 inch between the closest portions of said tool and said mass without contact between said tool and said mass; means providing an enclosed passage for electrolyte between said tool and said mass; means for supplying an electrically conductive electrolyte throughout said gap and between said closest portions and for flowing said electrolyte under pressure through said enclosed passage from an inlet disposed outside of the peripheries of the working face portion of said tool and of said surface to be provided in said mass on one side thereof across said working face portion between said working face portion and said surface of said mass to an outlet disposed beyond the peripheries of said working face portion and said surface only in directions generally parallel to the surface of said working face of the tool throughout said gap at a speed relative to the adjacent surfaces of said tool and said mass of from about 20 to 250 feet per second, and circuit means for supplying a positive voltage to said mass and a negative voltage to said tool, said circuit means furnishing a voltage sufficient to provide a current density of at least about 5 amperes per square inch through said electrolyte in said gap between said closest portions of said tool and said mass.

2. Apparatus according to claim 1 in which the positive drive means include means for advancing said tool relative to said mass along a straight line in a direction transverse to the flow of electrolyte in the gap at a predetermined substantially constant rate substantially equal to the rate at which material is removed from said mass adjacent to said gap.

3. A method of electrolytically removing material from an electrically conductive mass to provide the mass with a surface having a predetermined three dimensional contour and shape substantially corresponding to the contour, shape and area of the imperforate face portion of an electrically conductive tool, comprising: supplying a positive voltage to said mass; supplying a negative voltage to such an electrically conductive tool; placing said tool in close proximity to said mass; positively advancing said tool relative to said mass at a rate substantially equal to the rate at which material is removed from said mass and maintaining a gap of about 0.002 to 0.03 inch between the closest portions of said tool and said mass without contact between said face portion and said mass; supplying an electrically conductive electrolyte throughout said gap between said closest portions and flowing said electrolyte in a closed passage under pressure through said gap from an inlet disposed beyond the periphery of said face portion on one side thereof to an outlet disposed beyond the pehiphery of said face portion on another side thereof only in directions generally parallel to the surface of the face portion of said tool and transverse to the direction of movement of said tool at a speed relative to the adadjacent surfaces of said tool and said mass of about 20 to 250 feet per second, and supplying a voltage sufficient to provide a current density of at least about 5 amperes per square inch through said electrolyte in each said gap between said closest portions of said tool and said mass.

4. A method according to claim 3 in which said tool is moved relative to said mass along a straight line transverse to the flow of electrolyte in said gap at a predetermined substantially constant rate substantially equal to the rate at which material is removed from said mass adjacent to said gap.

5. Apparatus for electrolytically removing material from an electrically conductive mass to provide a predetermined three dimensional contour and shape therein, comprising in combination: two electrically conductive tools, each tool having an imperforate face portion having substantially the contour and shape to be provided in a portion of said mass; circuit means for making said mass the anode and each said tool the cathode in an electrical circuit; positive drive means for advancing said tools toward said mass at rates substantially equal to the rate at which material is removed from said mass adjacent said tools and for maintaining a gap of about 0.002 to 0.03 inch between the closest portions of each said tool and said mass; means providing an enclosed passage for electrolyte between said tool and said mass, and means for supplying an electrically conductive electrolyte throughout each said gap between said closest portions and for flowing said electrolyte in said enclosed passage through each said gap from an inlet disposed outside of the peripheries of the face portions of said tools and on one side of said face portions transversely across said face portions to an outlet disposed outside of the peripheries of said face portions on the opposite side thereof at a speed relative to the adjacent surfaces of each said tool and said mass of about 20 to 250 feet per second only in directions generally parallel to the surfaces of said face portions and generally transverse to the direction of movement of said tools, said circuit means furnishing a voltage sufficient to provide a current density of at least about 5 amperes per square inch through said electrolyte in each said gap between said closest portions of each said tool and said mass.

6. A method of electrolytically removing material from an electrically conductive mass to provide a predetermined three dimensional contour and shape therein corresponding to the contour and shape of the imperforate face portion of the electrically conductive tool, comprising: connecting said mass to the positive side of a direct current supply; connecting to the negative side of said direct current supply a pair of such electrically conductive tools; placing each said tool in close proximity to said mass; positively advancing each said tool toward said mass at a rate substantially equal to the rate at which material is removed from said mass and maintaining a gap of about 0.002 to 0.03 inch between the closest portions of each said tool and said mass without contact between said tool and said mass; supplying an electrically conductive electrolyte throughout each said gap between said closest portions and flowing said electrolyte under pressure in an enclosed passage through each said gap from an inlet disposed outside of the peripheries of said face portions of said tools on one side thereof transversely across said face portions to an outlet disposed beyond said peripheries of said face portions on the opposite side thereof only in directions substantially parallel to the surfaces of the face portions of said tools at a speed relative to the adjacent surfaces of each said tool and said mass of about 20 to 250 feet per second, and furnishing from said direct current supply a voltage sufficient to provide a current density of at least about 5 amperes per square inch through said electrolyte in each said gap between the closest portions of each said tool and said mass.

7. Apparatus for electrolytically removing material from an electrically conductive mass to provide a cavity therein, comprising in combination: an imperforate electrically conductive tool having at least on the face portion thereof substantially the three dimensional contour and shape to be provided in said cavity; positive drive means for advancing said tool at a rate substantially equal to the rate at which material is removed from said mass in a straight line towards said mass and for maintaining a gap of about 0.002 to 0.03 inch between the closest portions of said tool and said mass; means providing an enclosed passage for electrolyte between said tool and said mass and through said gap; means for supplying an electrically conductive electrolyte throughout said gap between said closest portions and for flowing said electrolyte under pressure through said passage from an inlet disposed beyond the periphery of the face portion of said tool on one side of said face portion to an outlet disposed beyond the periphery of said face portion of said tool on the opposite side of said face portion at a speed relative to the adjacent surfaces of said tool and said mass of about 20 to 250 feet per second, only in directions generally parallel to said adjacent surfaces and transverse to the direction of movement of said tool relative to said mass, and electric circuit means for supplying a voltage between said tool as a cathode and said mass as an anode sufficient to provide a current density of at least about 5 amperes per square inch through said electrolyte in said gap between said closest portions of said tool and said mass.

8. A method of electrolytically removing material from an electrically conductive mass to provide a cavity therein, comprising: making said mass the anode in an electrical circuit; making an electrically conductive tool having an imperforate face portion having a three dimensional surface having substantially the contour, shape and area to be provided in said cavity, making said tool the cathode in said circuit; placing said tool in close proximity to said mass, positively advancing said tool toward said mass in a straight line at a rate substantially equal to the rate at which material is removed from said mass and maintaining a gap of about 0.002 to 0.03 inch between the closest portions of said tool and said mass; and supplying an electrically conductive electrolyte throughout said gap between said closest portions and flowing said electrolyte under pressure in a closed passage through said gap from an inlet disposed beyond the periphery of said face portion on one side thereof transversely across said face portion to an outlet disposed beyond said periphery of said face portion on the opposite side thereof at a speed relative to the adjacent surfaces of said tool and said mass of about 20 to 250 feet per second only in directions generally parallel to said adjacent surfaces and transverse to the direction of movement of said tool relative to said mass, and supplying a voltage between said tool and said mass sufficient to provide a current density of at least about 5 amperes per square inch through said electrolyte in said gap between closest portions of said tool and said mass.

9. Apparatus for electrolytically removing material from an electrically conductive workpiece to provide a surface of the workpiece with a predetermined three dimensional contour and shape, comprising in combination: an electrically conductive tool, said tool having an imperforate face portion having a three dimensional contour, shape and area corresponding substantially to said predetermined three dimensional contour and shape with which said surface of said workpiece is to be provided; means for supporting said tool in close proximity to said surface and for advancing said tool relative to said surface at a rate substantially equal to the rate at which material is removed from said surface in a straight line generally transverse to said surface; means enclosing at least the face portion of said tool and said surface of said workpiece and thereby providing an enclosed passage for electrolyte between said face portion and said surface, said surface and said face portion being spaced from each other throughout said passage, said enclosing means having an inlet for electrolyte disposed outside of the periphery of said surface and outside of the periphery of said face portion of said tool and an outlet for electrolyte also disposed outside of the peripheries of said surface and of said face portion of said tool and spaced from said inlet whereby electrolyte flowing from said inlet to said outlet flows across said surface only in directions generally parallel thereto; means for supplying an electrically conductive electrolyte under pressure to said inlet and for flowing said electrolyte under pressure throughout said passage between the face portion of said tool and said surface of said workpiece throughout the entire area thereof only in directions generally parallel to said surface and transverse to the direction of movement of said tool, and circuit means for supplying a positive voltage to said surface of said workpiece and a negative voltage to said tool.

References Cited in the file of this patent

UNITED STATES PATENTS

| | | |
|---|---|---|
| 607,484 | Reider | July 19, 1898 |
| 1,276,599 | Weeks | Aug. 20, 1918 |
| 1,677,032 | Kaffer | July 10, 1928 |
| 2,383,383 | Harding | Apr. 21, 1945 |
| 2,441,319 | Harding | May 11, 1948 |
| 2,739,935 | Kehl et al. | Mar. 27, 1956 |
| 2,827,427 | Barry | Mar. 18, 1958 |
| 2,902,584 | Ullman | Sept. 1, 1959 |
| 2,937,124 | Vaughan | May 17, 1960 |
| 2,939,825 | Faust | June 7, 1960 |
| 3,002,907 | Williams | Oct. 3, 1961 |

FOREIGN PATENTS

| | | |
|---|---|---|
| 335,003 | Great Britain | Sept. 18, 1930 |
| 701,478 | Great Britain | Dec. 23, 1953 |
| 703,838 | Great Britain | Feb. 10, 1954 |
| 755,826 | Great Britain | Aug. 29, 1956 |